United States Patent [19]

Fukura et al.

[11] Patent Number: 4,785,382

[45] Date of Patent: Nov. 15, 1988

[54] RETRACTABLE LAMP DEVICE FOR VEHICLES

[75] Inventors: Kenichi Fukura; Hiroki Kondo, both of Toyoda; Yoshinori Kuroyanagi, Okazaki; Morito Kawaguchi; Shinji Miyamoto, both of Toyoda; Eiji Hiramatsu, Aichi; Akira Nishimura, Toyoda; Etsuo Suzuki, Miura; Kazuo Ikuta, Hiratsuka, all of Japan

[73] Assignees: Aisin Seiki Kabushiki Kaisha, Aichi; Kanto Jidosha Kogyo Kabushiki Kaisha, Kanagawa, both of Japan; a part interest

[21] Appl. No.: 130,513

[22] Filed: Dec. 9, 1987

[30] Foreign Application Priority Data

Dec. 12, 1986 [JP] Japan .................. 61-191972[U]

[51] Int. Cl.⁴ ............................................. B60Q 1/04
[52] U.S. Cl. ...................................... 362/65; 296/185
[58] Field of Search ............... 362/61, 64, 65, 66, 362/80, 285, 286, 287, 289, 370, 427, 428, 430; 296/1 R, 1 S

[56] References Cited

U.S. PATENT DOCUMENTS

| 3,387,125 | 6/1968 | Ingoliq | 362/65 |
| 4,049,309 | 9/1977 | Seal | 396/1 S |
| 4,246,628 | 1/1981 | Ikemizu et al. | 362/66 |
| 4,432,040 | 2/1984 | Matsuura et al. | 362/66 |
| 4,471,410 | 9/1984 | Nakano | 362/65 |
| 4,516,191 | 5/1985 | Moriyama et al. | 362/65 |

FOREIGN PATENT DOCUMENTS

| 128025 | 7/1984 | Japan . | |
| 0195438 | 11/1984 | Japan | 362/65 |
| 0082458 | 5/1985 | Japan | 362/65 |

Primary Examiner—Ira S. Lazarus
Assistant Examiner—D. M. Cox
Attorney, Agent, or Firm—Finnegan, Henderson, Farabow, Garrett & Dunner

[57] ABSTRACT

A retractable lamp device for vehicles includes a vehicles includes a vehicle body having a space for accommodating a lamp, a cover member rotatably mounted on the body to open or close the space, a motor for rotating the cover member. The retractable lamp further includes a movable member connected to the motor and an adjusting member for adjusting the surface level of the vehicle body and the cover member from outside of the vehicle.

7 Claims, 9 Drawing Sheets

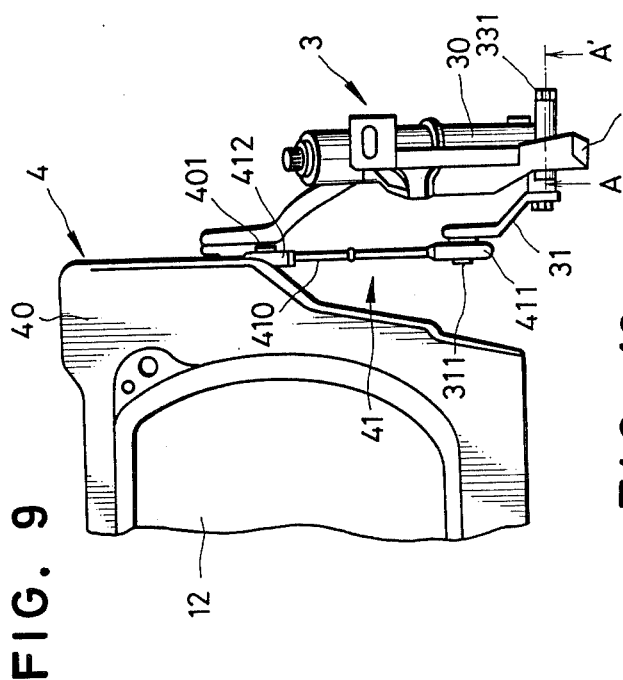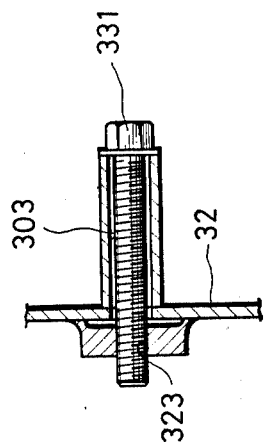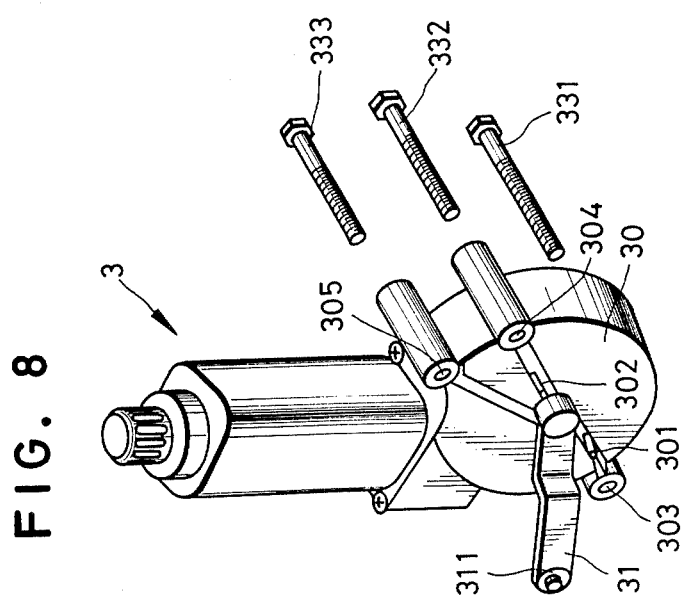

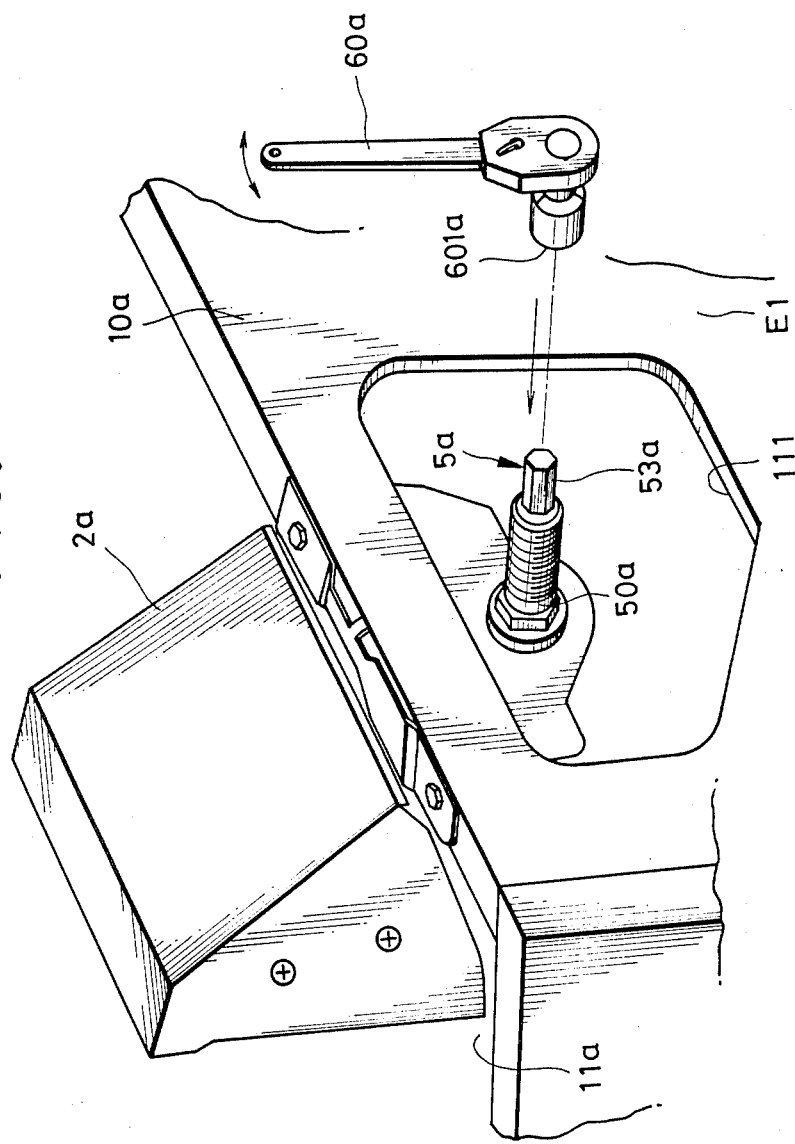

RETRACTABLE LAMP DEVICE FOR VEHICLES

BACKGROUND OF THE INVENTION

1. Field of the Invention

This invention relates to a retractable lamp device and more particularly to a retractable headlamp for vehicles.

2. Statement of Prior Art

Conventionally, as a headlamp for a vehicle, a retractable type headlamp device has been used. The headlamp of this type is moved or retracted into a space provided in a vehicle body when not used but is extended therefrom when it is being used. FIG. 12 shows one of such retractable headlamp device applied to a vehicle headlight system. The system includes a vehicle body 1c, a cover 2c which is movable with respect to the body 1c to open a space 11c at an open portion 110c, a movable member 4c on which a headlamp is attached and a motor 3c (FIG. 14) which drives the cover 2c to open. The motor 3c is operatively connected to a movable bracket 40c via levers 31 and 41c. The lever 41c has a bearing portion 412c with which a ball connecting portion 401c of the movable bracket 40c is connected (FIG. 15). A rubber made stopper 80 is provided to prevent a loose connection between the cover 2c and the movable member 4c therebetween. The stopper 80 is to be in contact with the bracket 40c of the movable member 4c when the headlamp is in retracted position (FIG. 12 or 13). The bracket 40c is pivoted at 404c of a fixed bracket 32 of the body 1c. Usually a headlamp device of the above type is preattached to the vehicle body during its assembly and thereafter the outer surfaces of the body 1c and the cover 2c are painted and dried. During the drying process, the rubber made stopper 80 may be deformed due to the heat as shown in FIG. 13, which will eventually reduce the surface level of cover 2c by L1 in FIG. 12 and accordingly may create a play L2 at the connecting portion between the movable bracket 40c and the lever 41c as shown in FIG. 16. Such difference in level between the cover and the body can be adjusted by an adjusting device provided in the cover 2c and cover 2c should be opened when the adjustment is needed. Therefore, it is difficult to adjust the surface level between the cover and body at the closed position.

SUMMARY OF THE INVENTION

It is, therefore, an object of the present invention to provide an improved retractable lamp device which obviates the above conventional drawbacks. It is another object of the invention to provide an improved retractable lamp device which may be easily adjusted to have a flash surface with a vehicle body when in retracted position.

BRIEF DESCRIPTION OF THE DRAWINGS

These and other objects of the invention will become apparent during the following discussion of the accompanying drawings, wherein:

FIG. 8 is a perspective view of motor 3 used in the present invention;

FIG. 9 is a front view of a portion of the embodiment shown in FIG. 1;

FIG. 10 is a cross sectional view taken along the line A—A' of FIG. 9;

FIG. 11 is a perspective view of another embodiment of the invention;

DETAIL DESCRIPTION OF THE PREFERRED EMBODIMENTS OF THE INVENTION

Figure 1:
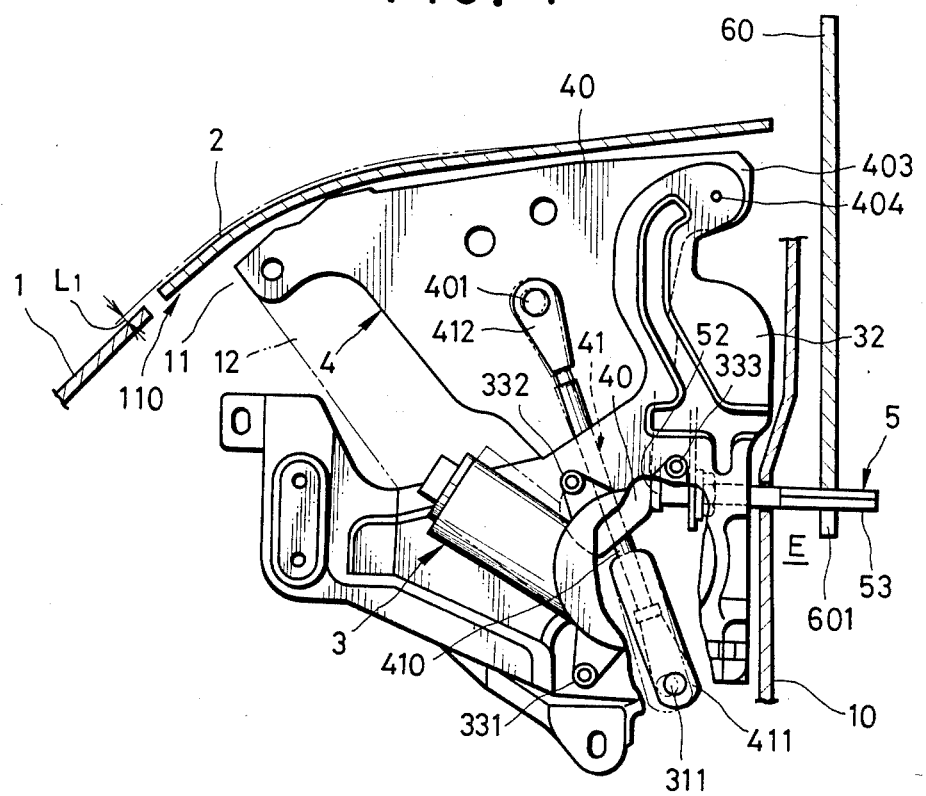
FIG. 1 is a cross sectional view of a retractable lamp device according to the invention.
Figure 2:
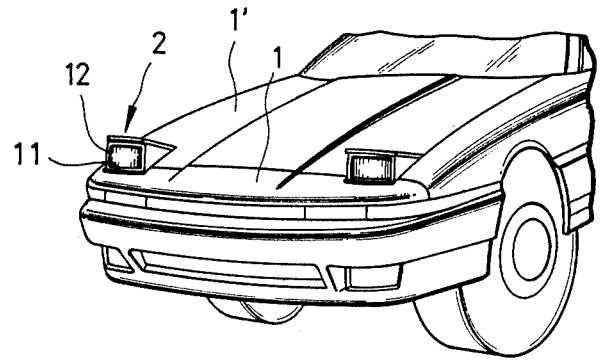
FIG. 2 is a view illustrating vehicle appearance where the retractable headlamp of the invention.
Figure 3:
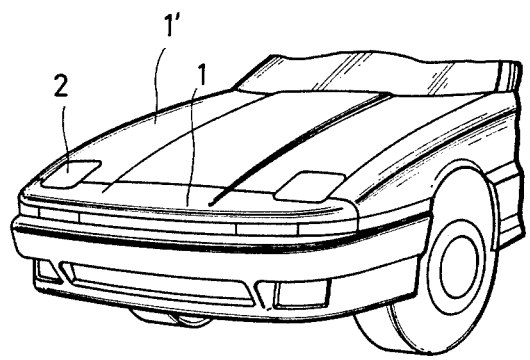
FIG. 3 is a similar view to FIG. 2 but showing the headlamp being in closed position.
Figure 4:
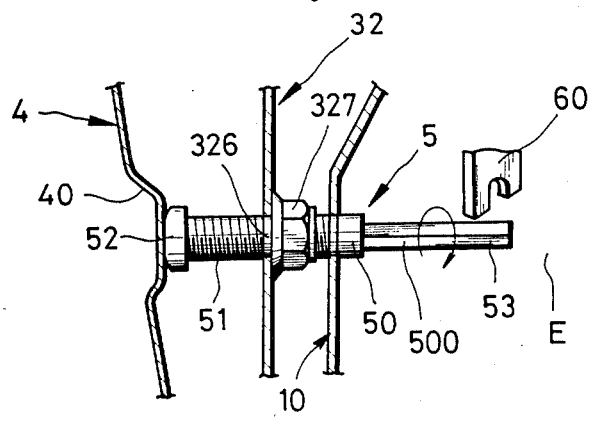
FIG. 4 is a partial cross sectional view of a portion of FIG. 1.
Figure 5:
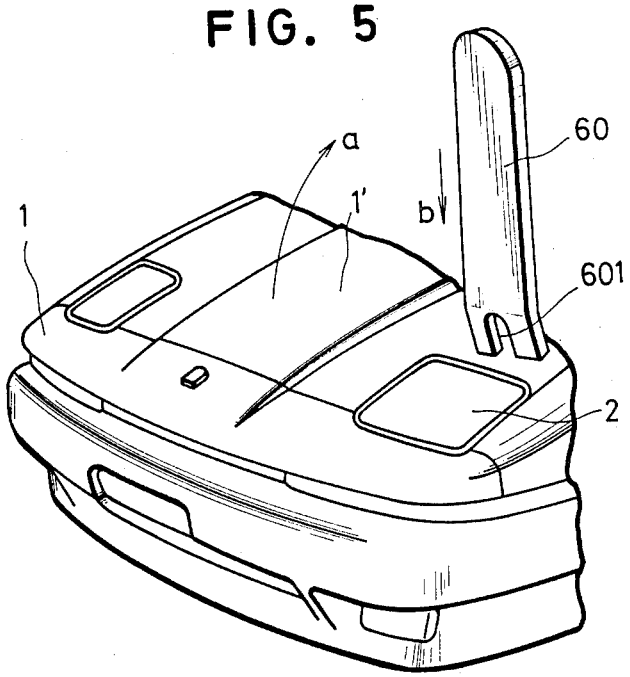
FIG. 5 is an enlarged view of FIG. 3 with adjusting member 60.
Figure 6:
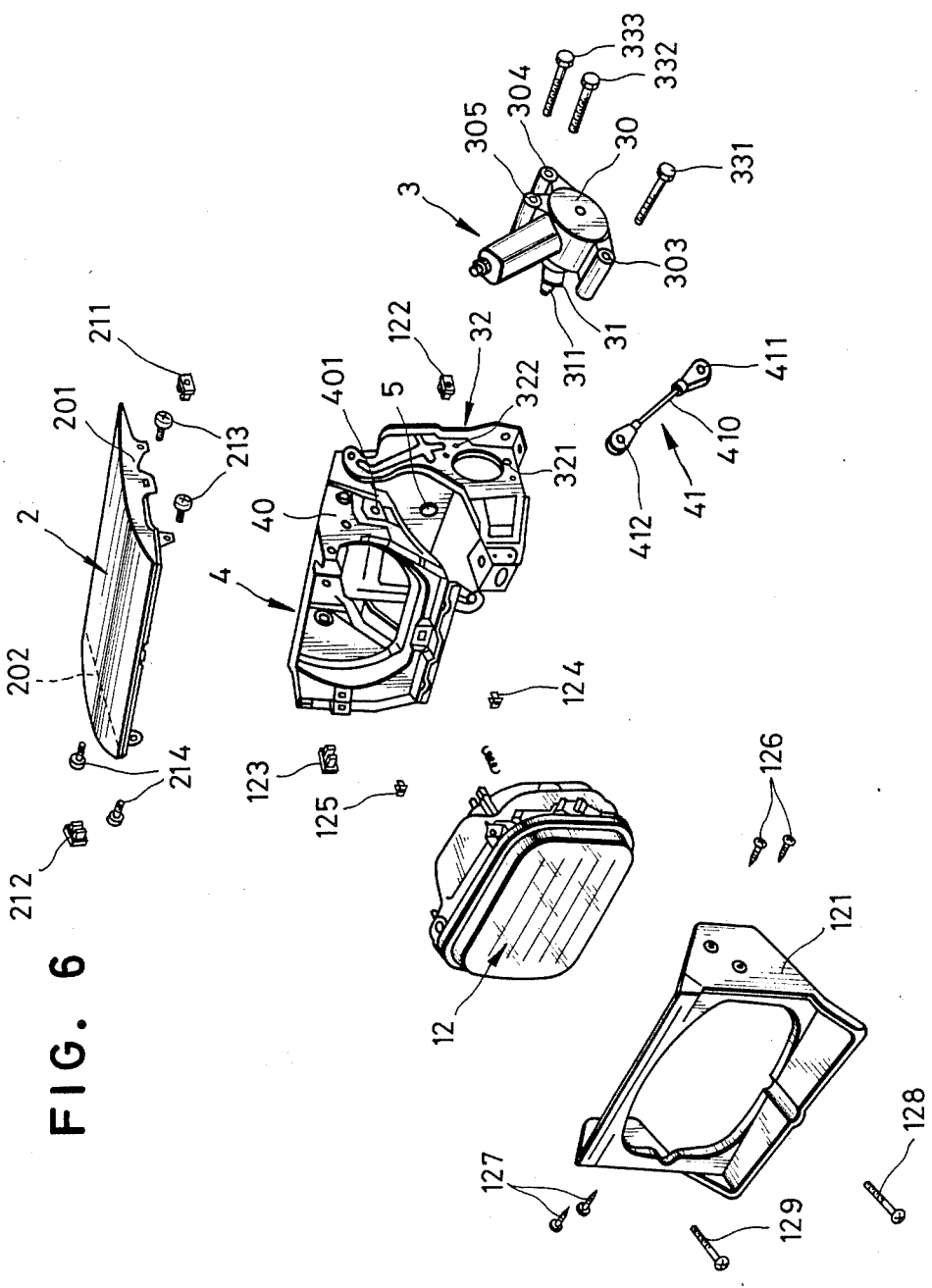
FIG. 6 shows an exploded view of the retractable lamp device according to the invention.
Figure 7:
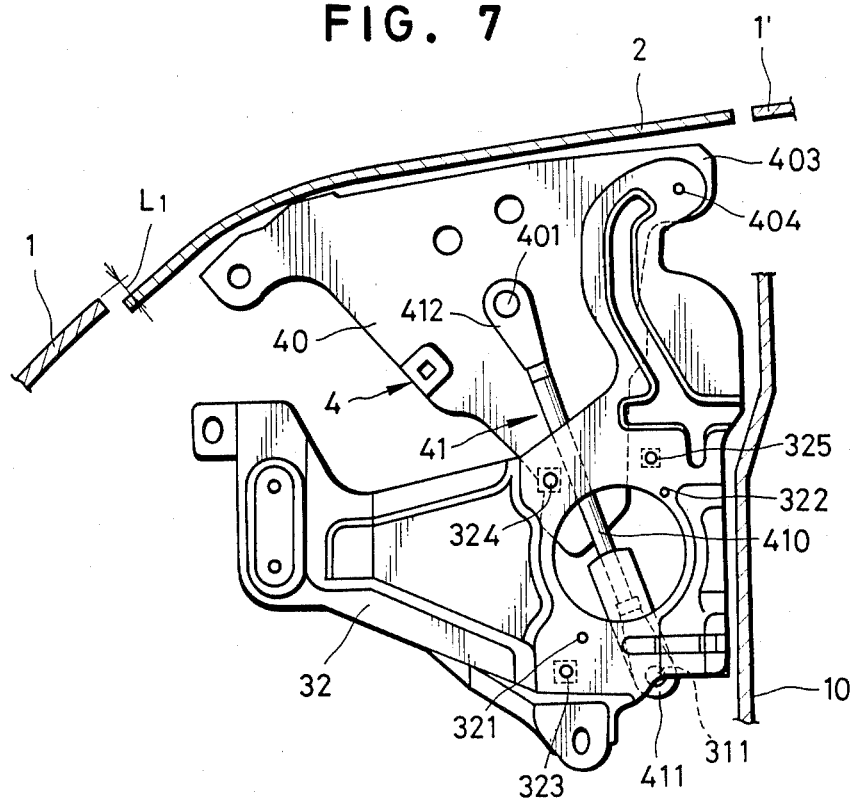
FIG. 7 is a cross sectional view of a fixed bracket 32 for motor used in the present invention.
Figure 12:
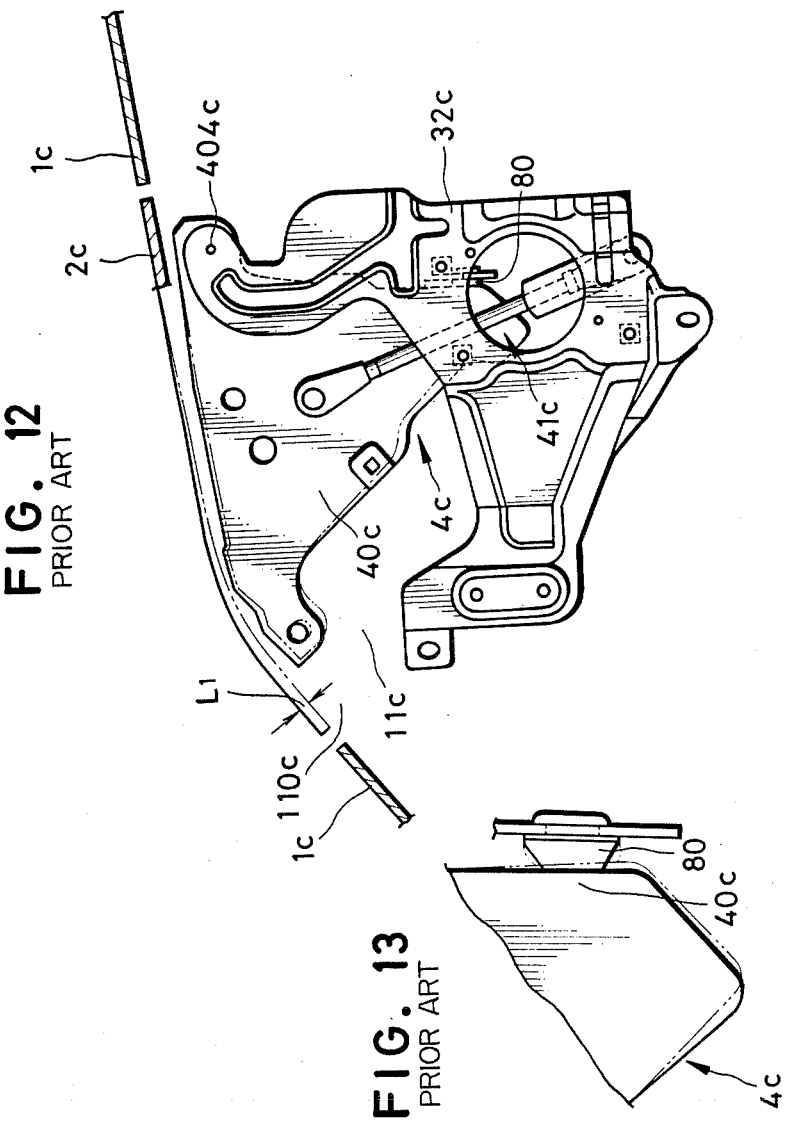
FIG. 12 is a cross sectional view showing a prior art device.
Figure 13:
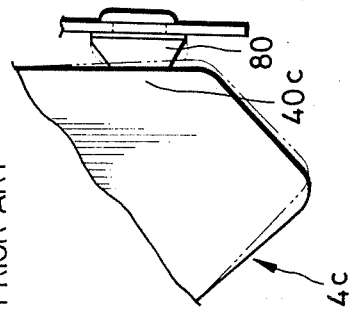
FIG. 13 is a partial view of FIG. 12 showing the relation between the stopper and movable member.
Figure 16:
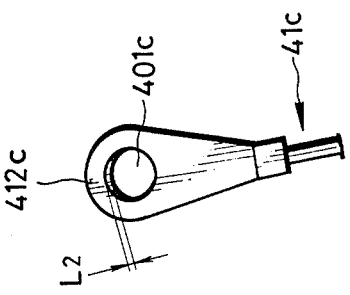
FIG. 16 is a view showing connection between lever 41c and bracket 40c.
Figure 15:
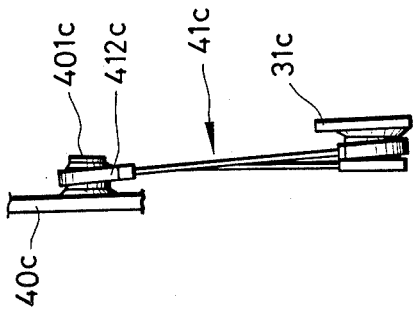
FIG. 15 is a front view of a portion of FIG. 12.
Figure 14:
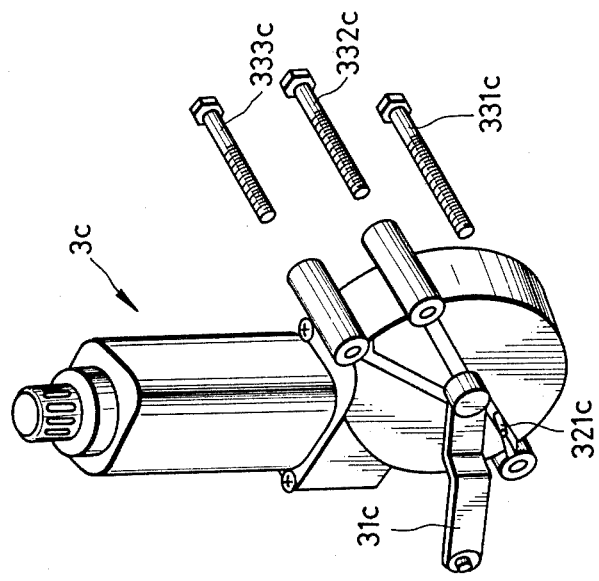
FIG. 14 is a perspective view of motor used in the prior art shown in FIG. 12.

Referring now to the drawings, particularly FIGS. 1–10, a retractable headlamp device for an automobile includes a vehicle body 1, cover 2, motor 3, movable member 4 and an adjusting device 5. The body 1 includes an accommodation space 11 for accommodating a headlamp 12 therein when it is not used. The cover 2 is pivotably mounted on the body 1 to open and close an opening 110 of the space 11. The cover 2 is connected to movable member 4 and motor 3. The motor 3 drives the cover 2 to open or close the opening 110 of the space 11 and mounted on a fixed bracket 32 which in turn is integrally connected to the body 1. As shown in FIG. 8, motor 3 includes main body 30 which has a plurality of projections 301 and 302 and further includes three attachment holes 303–305. The motor 3 further includes a lever 31 rotatable upon the motor driving to move lever 41 of the movable member 4. Pins 301 and 302 are inserted into the corresponding holes 321 and 322 to secure the motor to the fixed bracket 32. Attaching bolts 331 through 333 are inserted into the corresponding holes 303 through 305 and then the motor 3 with the bolts is secured to the bracket 32 by threading into the holes 323 through 325 of the bracket 32. Thus the motor 3 is accurately and securely fixed to the bracket 32 without causing any play otherwise might be caused as shown in an imaginary line in FIG. 1. Movable member 4 includes a movable bracket 40 and connecting lever 41. The bracket 40 is rotatably mounted on the fixed bracket 32 at portion 403 by pivot pin 404. As shown in FIG. 6, the bracket 40 includes various screws 122–123, 211–212, and 124–129 for securing a headlamp 12 and headlamp door 121. The bracket 40 further includes screws 213 and 214 for connecting to the cover 2 at side surfaces 201 and 202. The lever 41 includes a bearing portion 411 for connecting to a connecting portion 311 of the lever 31 of the motor 3 and another bearing portion 412 for connecting to a bearing portion 401 of the bracket 40. Thus the lever 31 is operated to move the bracket 40 in vertical direction with the cover 2 when the motor 3 is actuated. Adjusting device 5 is disposed between the movable member 4 and the body 1 for adjusting the position of the cover 2 with respect to the body 1 and is operable outside of the cover 2. As is shown in FIG. 4, the adjusting device 5 includes a weld lock nut 327 secured to the fixed bracket 32 at its hole 326 and a down stopper 50 having a thread portion 51 engaged with the nut 327, a head 52 to be in contact with a portion of the movable bracket 40 and an operating portion 53. The operating portion 53 of the adjusting device 5 is extending through a partition 10 which separates the space 11 with an engine compartment E. The partition 10 is secured to the body 1. The operating portion 53 includes adjusting pin 500 extending from the accommodating space 11. An adjusting tool 60 has an engaging portion 601 for rotating the operating portion 53 of the adjusting device 5. This adjusting can be made outside of the cover 2 and also the engagement between the tool 60 and the operating portion 53 can be seen from outside of the vehicle. The operating portion 53 has at least two surfaces to be easily engaged with the tool 60. The adjustment will be carried out in the following manner:

First, the engine hood 1' is opened in "a" arrow direction in FIG. 5 and the tool 60 is inserted in "b" direction to engage the portion 601 thereof with the operating portion 53 of the adjusting device 5. After the engagement between the tool 60 and the operating portion 53, the tool 60 may be rotated in clockwise or counterclockwise direction thereby to move the head portion 52 to adjust the position of the movable bracket 40 keeping the eye on the difference L1 in level between the cover 2 and the body 1.

Referring now to the second embodiment of the invention in accordance with FIG. 11, accommodation space 11a is separated from the engine compartment E1 by the partition 10a. The partition 10a inludes an adjusting window 111 through which adjusting device 5a is adjustable by using tool 60a. When the engine compartment E1 is small, this embodiment may be used. Numeral 2a designates the cover, numeral 601a designates engaging portion of the tool 60a with which the operating portion 53a of the adjusting device 5a is engaged. Other part of this embodiment is same or approximately same to the previous embodiment and therefore the explanation is omitted.

According to the invention, the surface level of the retractable lamp device and the vehicle body level can be adjusted to be the same level from outside. Although the invention has been described in its preferred form, it is to be understood that the invention is not limited to the specific embodiments thereof except as defined in the appended claims.

What is claimed is:

1. A retractable lamp device for vehicles comprising:
   a vehicle body having an accommodating space for accommodating a lamp therein;
   a cover means rotatably mounted on the body to open and close the accommodating space;
   a motor means for rotating the cover means;
   a movable means operatively connected to the motor and having the lamp connected therewith; and
   an adjusting means for adjusting a surface level between the cover means and the vehicle body from outside of the vehicle, the adjusting means including an adjusting member adjustably moving the movable means connected to the cover means.

2. A retractable lamp device according to claim 1, wherein the movable means includes a movable bracket which is operatively connected to the motor means.

3. A retractable lamp device of claim 2, wherein a fixed bracket is provided on the vehicle body and the movable bracket is rotatably mounted on the fixed bracket for moving the lamp attached to the movable bracket.

4. A retractable lamp device of claim 3, wherein the adjusting means further includes an adjusting tool means for manually operating the adjusting member from outside of the vehicle.

5. A retractable lamp device of claim 4, wherein the adjusting member includes a head which is in contact with the movable bracket an operating portion extending from the accommodating space for engaging with the adjusting tool to be rotated to move the head toward or rearward of the movable bracket.

6. A retractable lamp device of claim 2, wherein adjusting member extends from the accommodating space into an engine compartment of the vehicle.

7. A retractable lamp device of claim 6 wherein a partition is provided between the accommodating space and the engine compartment and has an adjusting opening through which a part of the adjusting member extends toward the engine compartment.

* * * * *